Sept. 21, 1971           K. HOFFMANN           3,606,831
APPARATUS FOR EXTRACTING LIQUID FROM AND FOR
CONVEYING LIQUID-CONTAINING
TANNERY WASTE MATERIALS Filed Sept. 10, 1969           3 Sheets-Sheet 1

INVENTOR
Kasimir Hoffmann
BY
Craig, Antonelli, Stewart & Hill
ATTORNEYS

Sept. 21, 1971          K. HOFFMANN          3,606,831
APPARATUS FOR EXTRACTING LIQUID FROM AND FOR
CONVEYING LIQUID-CONTAINING
TANNERY WASTE MATERIALS
Filed Sept. 10, 1969          3 Sheets-Sheet 2

*INVENTOR.*
Kasimir Hoffmann
BY
Craig, Antonelli, Stewart & Hill
ATTORNEYS

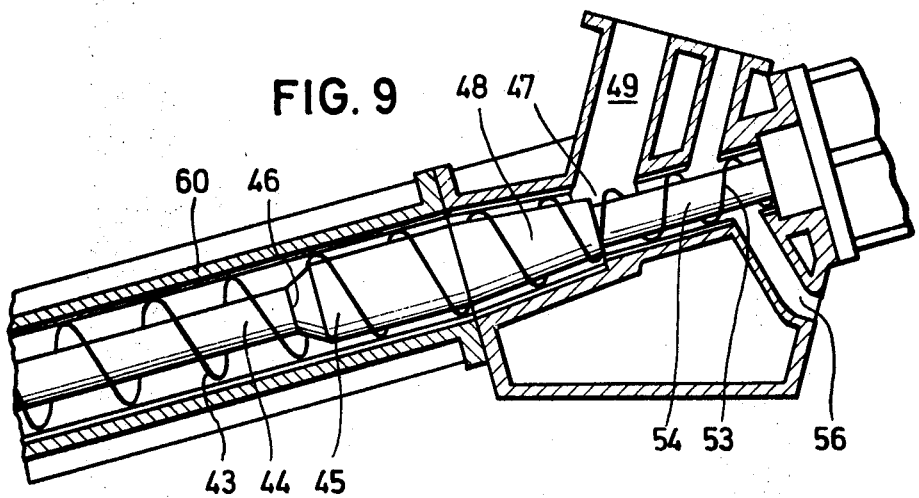
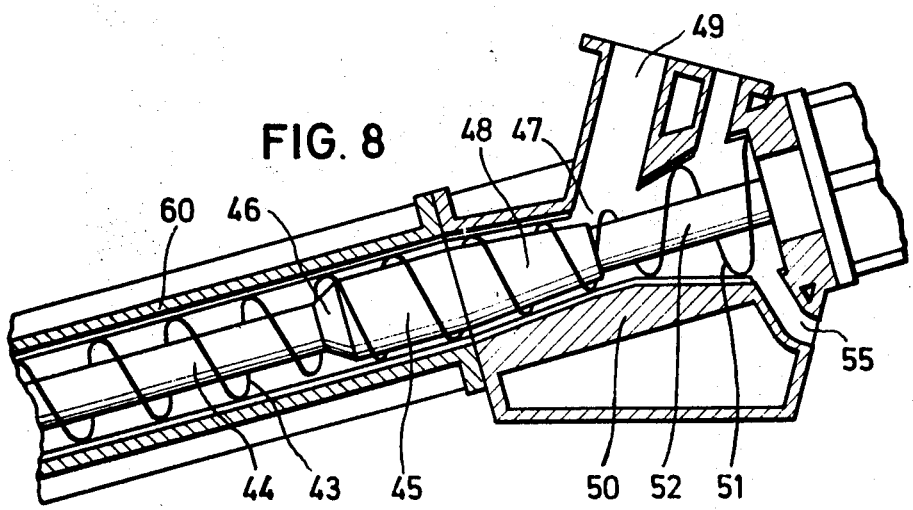
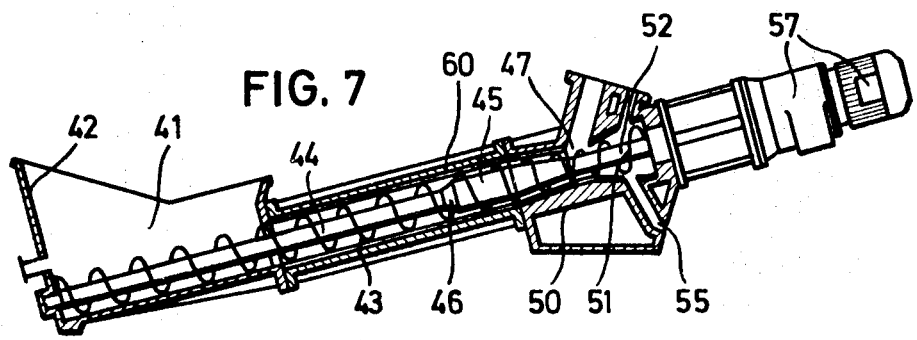

United States Patent Office 3,606,831
Patented Sept. 21, 1971

3,606,831
APPARATUS FOR EXTRACTING LIQUID FROM AND FOR CONVEYING LIQUID-CONTAINING TANNERY WASTE MATERIALS
Kasimir Hoffmann, Forst, near Bruchsal, Germany, assignor to Badische Maschinenfabrik G.m.b.H., Karlsruhe-Durlach, Germany
Filed Sept. 10, 1969, Ser. No. 856,696
Claims priority, application Germany, Sept. 12, 1968, P 17 85 338.2
Int. Cl. B30b 9/16
U.S. Cl. 100—145                                         2 Claims

ABSTRACT OF THE DISCLOSURE

Apparatus for extracting liquid from and for conveying liquid containing tannery waste materials, more especially so-called scrap leather which forms with the fleshing of animal skins. The apparatus has a housing, inlet and outlet openings for the housing, a conveyor pipe connected to the outlet, a worm for receiving waste material at the inlet. The worm has a free volume which decreases from the inlet to the outlet between flights on the worm.

---

Figure 1:
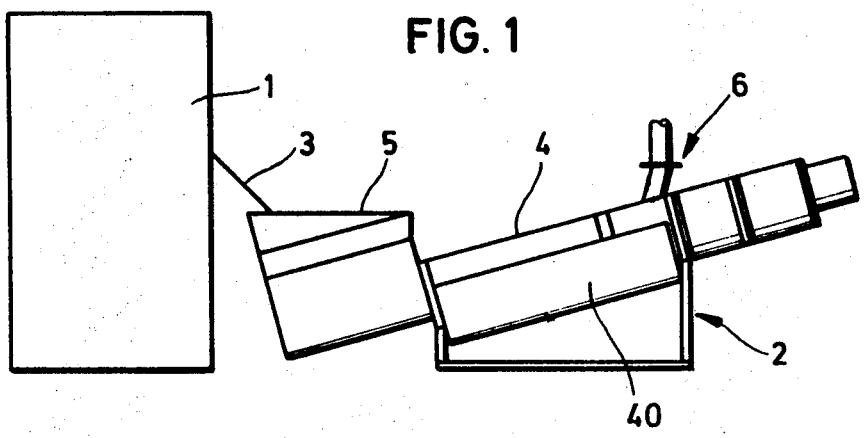

The invention relates to an arrangement for extracting liquid such as water from liquid-containing tannery waste materials, more especially from so-called glue-making leather obtained with the fleshing of animal skins.

The glue-making leather forms as waste at the time of fleshing the untreated skins or hides on so-called "folding" machines and consists essentially of fat-containing flesh residues, connective tissues, hairs, skin particles and the like. This glue-making scrap or waste leather usually drops into a pit which is arranged beneath the fleshing or folding machine and remains therein until a certain quantity is reached. Because of the chemical processes which precede the fleshing operation, this mass of material is concentrated with about 50% of liquid, consisting of water and residual chemicals, so that it represents a spongy agglomeration.

It is true that this mass is slightly dehydrated while it is deposited in the pit, but it is still always extremely difficult to handle. The emptying of the pit has usually been carried out hitherto by shoveling the mass on to suitable conveyor trucks or the like, and obviously this is not only an extremely difficult operation, but in addition is also unhygienic. The glue-making scrap or waste leather is then deposited in hoppers and is carried away on vehicles at relatively large intervals of time for being further processed. Because of the readily decomposing and rotting constituents (this rotting process is assisted by the high liquid content which is always present), this mass always represents a danger to hygiene. Nevertheless, the processing of this mass cannot be disregarded, since glue, gelatine and the like are produced therefrom.

The transporting of the scrap leather to the factories where it is processed is consequently difficult, as it is frequently forbidden for such a mass of material to be carried on public means of transport, since liquid in the form of dirty water drips out of the vehicles.

It is an object of the invention to provide effective means in this respect and further to develop the working procedures in tanneries, including the transport procedures, more especially from a technical operational and hygienic point of view.

For this purpose, according to the invention, an apparatus for removing liquid from and conveying scrap leather is provided, which is characterised by a worm or screw press which receives the waste materials at an inlet opening and which has a free volume decreasing from the inlet to an outlet opening between the worm spirals, and comprising a conveyor pipe connected to the outlet opening.

This apparatus, which preferably is directly connected to a fleshing machine, firstly permits the extraction of water from the scrap leather, and secondly permits a considerable compression of the scrap leather, so that not only is there provided a reduction in weight, but also a reduction in volume, and this is important as regards the further transport of the scrap leather. An effect additionally achieved by the compression is that considerably less air can enter the scrap leather in the stored state. Thus, the rotting process is considerably slowed down, not only because of the reduced water content, but also because of the reduced action by air.

The scrap leather is directly supplied without intermediate storage to the water-extracting apparatus, so that the evil-smelling and non-hygienic scrap leather can be removed immediately after it is produced from the tannery. Since the conveyor pipe is directly connected to the outlet opening, the dehydrated scrap leather can be conveyed over large distances solely by the pressure produced by the worm, without separate conveying means being necessary for this purpose. By such conveying action over long distances, it is possible to assume that the scrap leather has lubricating properties because of the tissue and fatty constituents which are contained therein.

According to one form of the invention, the worm has a core diameter which becomes larger towards the outlet opening while the flight diameter remains the same. As a consequence thereof, the free volume towards the discharge opening becomes steadily smaller, corresponding to the steady extraction of liquid.

The change in diameter can either occur progressively, or in accordance with the one embodiment of the invention, by the worm comprising a first cylindrical core section of small diameter and a second cylindrical core section of larger diameter, with a steep conical transition between the two core sections. The use of a worm with a core becoming progressively thicker or with a sudden change in diameter of the core depends essentially on the prevailing conditions. When using a worm having a sudden change in core diameter, a particularly good water extraction is produced. Furthermore, with this embodiment, the formation of liquid occlusions within the dehydrated length is largely avoided.

When using a core having a constant conical form, the housing which surrounds the worm preferably has upwardly open slots which extend approximately longitudinally of the worm. Thus, when using such a worm core, liquid occlusions in the dehydrated length of material are also prevented.

With such an embodiment, the housing consists of a plurality of strips or bars which extend longitudinally of the worm and which are so assembled that they produce a substantially circular, free housing cross-section while at the same time forming the slots. It is possible in this way to assemble the housing in a manner which reduces expense. Furthermore, such a housing is of comparatively low weight as compared with a housing of solid material. Also, the dehydration slots can be made extremely narrow, and in fact down to fractions of a millimetre. This is important, since it is possible in this way to avoid the slots becoming clogged. Even if a clogging should occur, the strips or bars can be easily released, so that the maintenance of the apparatus does not present any difficulties.

It is further proposed according to the invention that the strips or bars should be provided with a coating of chemically resistant material, at least on their longitudinal edges which form the slots, so that those constituents of the scrap leather which have an aggressive action, especially over a comparatively short period of time, are not able to produce any constriction of the slots because of corrosion. An additional feature is that these surfaces can be machined comparatively finely, so that the movement for the material being conveyed in the housing is improved and thus the danger of clogging is reduced.

With one particularly advantageous embodiment, the housing consists of spaced main bars and supplementary bars arranged in the interstice between the main bars, each supplementary bar forming a slot with the adjacent two main bars. It is for example possible in this case for the supplementary bars to be made comparatively narrow, while the main bars take up the main loading due to the pressure of the worm or screw. Furthermore, the main bars can consist of a comparatively less costly material, for example, of grey cast iron, while the supplementary bars are made of a conventional structural steel. The main bars, and also the supplementary bars, preferably have a chemically resistant coating on their mutual contact edges. By way of example, circular rods can be let into the main bars consisting of grey cast iron, adjoining which are flat bars or strips, advantageously of the same chemically resistant material, which are arranged on the supplementary bars. By such a geometrical design, a particularly favourable and narrow gap formation is produced.

Furthermore, the housing preferably comprises on its inside means which prevent the material also being revolved. These means can for example be channels, projections or the like, which extend substantially longitudinally, so that the conveying of the material inside the worm or screw housing is guaranteed.

Finally, the inlet opening which is at a low level can be closed by a pivoted flap which opens under gravity and as a result switches on the driving motor of the worm. This arrangement provides that the worm or screw press is set in operation without any delay when any waste materials are present.

According to yet another embodiment of the invention, which is more especially used in combination with a worm having a sudden change in diameter, the worm has a counter-pressure worm associated with it in the region of the outlet or discharge opening. This counterpressure worm fulfills two purposes. Finally, the dehydrated material is delivered to the conveying pipe without it settling on the end of the worm, and secondly any liquid occlusions which may possibly be present are eliminated by the counter-pressure. In this case, by contrast with the embodiment which has previously been discussed, the housing can be peripherally closed, practically over the entire length. In addition, the worm and counterpressure worm advantageously comprise a common core with a single drive means.

The outlet or discharge opening is advantageously formed by a conical housing section which extends axially of the worm and is adapted to it in the region of decreasing pitch diameter, the section being adjoined by the delivery pipe, which projects with slight curvature from the axial direction of the worm. If an embodiment having a counter-pressure worm is chosen, the delivery pipe is deflected upwardly in the region between the worm and counterpressure worm from the axial direction thereof. As a result, a satisfactory transitional flow into the delivery pipe is provided for the continuous length of material, without there being any danger of length being broken.

Figure 2:
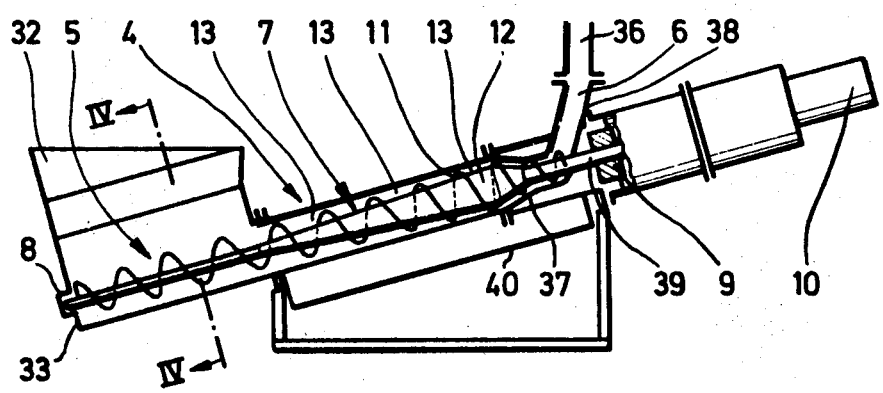
Figure 3:
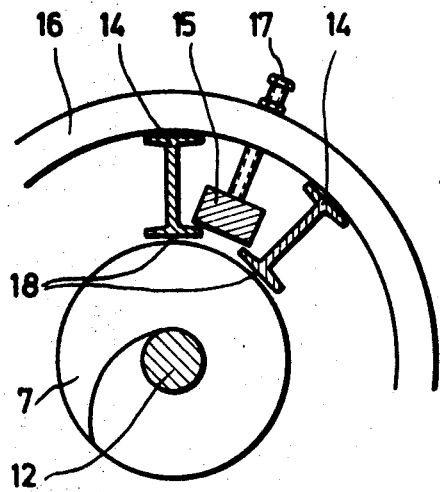
Figure 4:
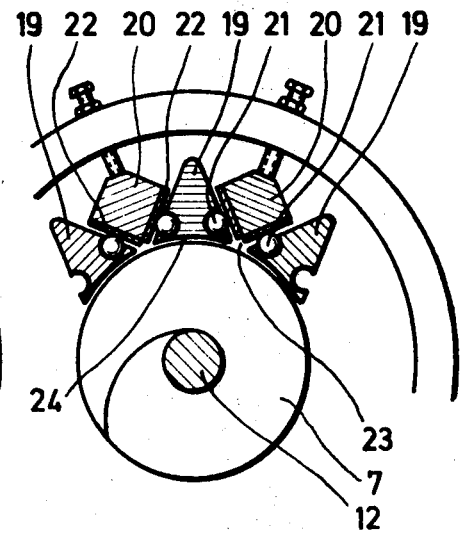
Figure 5:
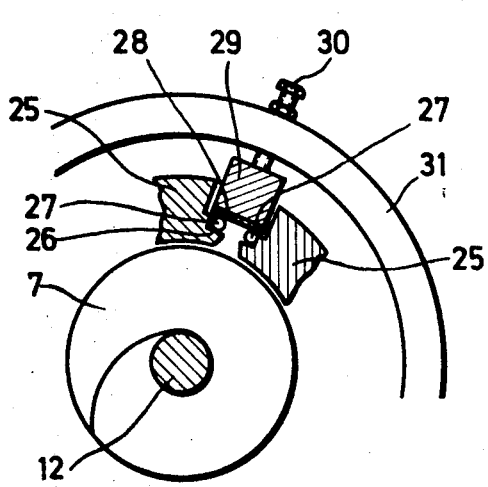
Figure 6:
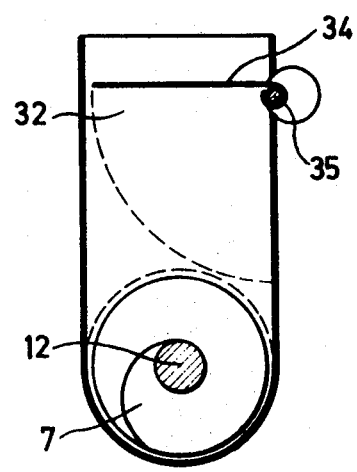

Several embodiments of the invention will now be described by way of example with reference to the accompanying drawings in which:

FIG. 1 is a diagrammatic overall view of the apparatus, associated with a fleshing machine, FIG. 2 is a longitudinal section through one embodiment of the apparatus, FIGS. 3 to 5 are cross-sections through different embodiments of the housing of the apparatus, FIG. 6 is a section on the line VI—VI of FIG. 2, FIG. 7 is a longitudinal section similar to FIG. 2 through another embodiment, FIG. 8 is a detailed longitudinal section of the rear end of the apparatus according to FIG. 7, and FIG. 9 is a detailed longitudinal section through the rear end of another embodiment of the apparatus.

In FIG. 1, a fleshing machine 1 is shown in diagrammatic form and this is connected to the apparatus 2 according to the invention. The scrap leather delivered by the fleshing machine passes by way of a conveyor, for example, over a chute 3, to the apparatus 2, which comprises a housing 4 with an inlet opening 5 and an outlet opening 6, the latter being followed by a conveyor pipe.

The apparatus 2 is shown in greater detail in longitudinal section in FIG. 2. Running inside the housing 4 is a worm or screw 7, which is mounted at 8 and 9, respectively. The worm is driven by a driving motor 10. The pitch 11 of the worm 7 is arranged on a core 12 which simultaneously forms the driving shaft and which increases in size conically from the inlet opening 5 to the outlet opening 6, so that the volume of the clearance spaces 13 between the periphery of the worm 7 and the internal wall of the housing 4 decreases in this direction. In this constructional example, the housing 4 comprises upwardly open longitudinal slots which extends in axial parallel relation and which serve for the discharge of the expressed liquid.

FIGS. 3 to 5 show different constructional forms of the housing, it being possible to see therefrom, for example, the formation of the water-extraction slots. In these constructional forms, the water-extraction slots are formed by the fact that the housing consists of a large number of juxtaposed strips or bars extending longitudinally of the worm, the slots being provided in each case between the bars.

In the constructional example as shown in FIG. 3, the bars consist of section members, for example, T-section members 14, which form the so-called main bars, and supplementary bars 15 of any suitable cross-section which are positioned between the latter. The main bars 14 are welded at the end flanges, whereas the supplementary bars 15 are in each case pressed by means of a clamping ring 16 with tensioning screws 17 on to the lower T-beams of the main bars 14. A slot of small but adjustable width is produced between the supplementary bars 15 and these T-section beams 18.

In the constructional form according to FIG. 4, main bars 19 again consist of a sectional material, which can for example be made of grey cast iron. Supplementary bars 20, preferably of steel, are introduced between the main bars 19. In this constructional form, the bars have at least one coating of chemically resistant material. By way of example, circular rods 21 of stainless steel are embedded in the main bars 19, while the supplementary bars 20 comprise plate-like attachments 22 on their longitudinal sides facing the circular rods 21, the attachments likewise consisting of stainless steel. An extremely narrow slot is formed between the circular rods 21 and the plates 22, and the slidability can be promoted by suitable machining of the plate in the region of the gap.

Spaces 23 which remain between the main bars 19 and the supplementary bars 20 inserted from above largely prevent a concurrent rotational movement of the dehydrated and compressed continuous length of scrap leather. Projections, grooves or the like can additionally be provided on the inner sides 24 of the main bars, such projections or the like serving the purpose of ensuring that the transport in the longitudinal direction is not interrupted.

In the constructional example as shown in FIG. 5, main bars 25 consist of sectional material and comprise on their two longitudinal sides shoulders 26, on which circular rods 27 of stainless steel are fixed. Bearing on the circular rods 27 is a plate 28 of a supplementary bar 29, to form the water-extraction slots. Each of the said supplementary bars is forced against the main bars 25 by means of a clamping element 30, which is supported on a ring 31.

As already apparent from FIGS. 3 to 5, many modifications to the housing are possible, it merely being necessary always to ensure that a gap of the smallest possible width is produced for the water-extraction slots.

As can be seen from FIG. 2, the housing 4 of the apparatus is mounted at an inclination and comprises at its lower end an opening 33, which serves for the removal of water from the housing. As shown in FIG. 1 a collecting tank 40 can also be arranged beneath the housing, and the water leaving the opening 33 and also the water-extraction slots runs into the tank 40.

With the cross-section through the housing in the region of the supply hopper 32, as shown in FIG. 6, a pivoted flap 34 is provided, which seals off the inlet opening 5 in the housing. This pivoted flap is mounted in its bearing under spring force, so that it only pivots or swings inwardly when a certain quantity of material has dropped on to the flap. With this pivotal movement, the flap simultaneously actuates a switch (not shown), which starts the driving motor.

It is apparent from FIG. 2 that a conveyor pipe 36 is connected to the discharge opening 6. In order to prevent an expansion of the continuous length of material on entering the conveyor pipe, the housing is reduced conically at its outlet end at 37, as shown in FIG. 2, and simultaneously the external diameter of the worm 7 is correspondingly reduced. Furthermore, the diameter of the worm core is adapted to this reduction. In this way, a practically constant free cross-section is produced in the region of the outlet opening 6, so that the expressed continuous length of material is in practice scarcely able to expand. In addition, the tubular section 38 which follows the conical housing section 37 extends with a slight curvature from the direction of the longitudinal axis of the worm, so that a favourable transitional flow is produced. In addition, the driving shaft 39 of the motor 10 is introduced into the housing in the region of this curved portion.

The conveyor pipe 36, which is shown broken away in FIG. 2 leads, for example, to an intermediate storage arrangement which is disposed outside the tannery and in which the dehydrated and compressed material is stored until it is carried away for further processing. The pressure produced by the worm is sufficient in this case to convey the expressed continuous length of material over large distances (of tens of metres).

In the constructional forms as shown in FIGS. 7 to 9, the housing has not been provided with longitudinally extending slots. In order nevertheless to make possible a satisfactory dehydration necessary for transport purposes, another constructional form of the worm is provided.

It is to be seen from FIG. 7 that the housing 60 is closed peripherally. As in the constructional examples already described, it comprises an inlet opening 41 with a supply hopper 42 or the like. Mounted inside the housing 60 is a worm 43 of constant flight diameter and consisting of two cylindrical core sections 44, 45 of different diameters. The transition between the two core sections 44, 45 is provided by a steep cone 46, as can be more clearly seen from FIGS. 8 and 9. Following the core section 45, which has the larger diameter, and extending towards the discharge opening 47, as in the first embodiment, is another conically tapering core section 48. The discharge opening 47 discharges into a conveyor pipe 49, of which here only a union is shown and to which can be connected ducts of any suitable cross-section.

In the constructional form according to FIG. 9, the worm flight 53 and core 54 are cylindrical, so that additional water extraction is effected solely by the worm pressure.

In both constructional forms (FIGS. 7, 8 and 9, respectively), the core 52 and 54, respectively, of the counterpressure worm 51, 53 forms a part of the core of the main worm 43. Provided in the region of the counterpressure worm 51 or 53 is another water-extraction opening 55 and 56, respectively. Moreover, in both constructional forms, the counterpressure worms terminate in the region of the discharge opening 47, so that the dehydrated and transported continuous length of material is supplied under high pressure to the conveyor pipe 49.

Having thus described the invention what is claimed is:

1. Apparatus for extracting liquid from and for conveying liquid-containing tannery waste materials comprising worm press means having an inlet opening for receiving said waste materials and an outlet opening, said worm press means having a free volume which decreases from the inlet opening via a conical tapered section to the outlet opening by means of a first cylindrical core section, a second cylindrical core section of larger diameter than said first core section, a relatively steep conical transition member between said first and second core sections, conveyor means operatively connected with the outlet opening, and counterpressure worm means arranged behind the outlet opening with respect to the conveying direction.

2. Apparatus according to claim 1, wherein said worm press means and said counterpressure worm means have a common core and single drive means.

References Cited
UNITED STATES PATENTS

| | | | |
|---|---|---|---|
| 689,440 | 12/1901 | Tuska | 100—145 |
| 772,230 | 10/1904 | Farner | 100—146X |
| 829,314 | 8/1906 | Anderson | 100—145X |
| 1,344,790 | 6/1920 | Burrows | 100—145 |
| 3,009,412 | 11/1961 | Jung | 100—150X |

J. L. DECESARE, Primary Examiner

U.S. Cl. X.R.
100—129